United States Patent [19]

Ginn et al.

[11] Patent Number: 5,454,865
[45] Date of Patent: Oct. 3, 1995

[54] METHOD FOR PREPARING REFINED KAOLIN IN CLAY PRODUCTS

[75] Inventors: Michael W. Ginn, Wrightsville; Gary Cobb, Davisboro, both of Ga.

[73] Assignee: ECC International Inc., Atlanta, Ga.

[21] Appl. No.: 173,200

[22] Filed: Dec. 23, 1993

[51] Int. Cl.$^6$ .................................................. C04B 14/10
[52] U.S. Cl. .................... 106/486; 106/484; 106/488; 252/186.1; 501/145; 501/146; 501/148; 209/39
[58] Field of Search ..................... 106/484, 486, 106/488; 252/186.1; 501/145, 146, 148; 423/581; 209/39

[56] References Cited

U.S. PATENT DOCUMENTS

| | | | |
|---|---|---|---|
| 2,990,958 | 7/1961 | Greene et al. | |
| 3,138,550 | 6/1964 | Woolery. | |
| 3,393,082 | 7/1968 | Lyons et al. | 106/486 |
| 3,394,022 | 7/1968 | Lyons et al. | 106/486 |
| 3,450,257 | 6/1969 | Cundy et al. | |
| 3,627,678 | 12/1971 | Marston. | |
| 3,974,067 | 8/1976 | Nott. | |
| 4,186,027 | 1/1980 | Bell et al. | 106/486 |
| 4,518,491 | 5/1985 | Bilimoria et al. | |
| 4,618,374 | 10/1986 | Thompson, III et al. | 106/486 |
| 4,650,521 | 3/1987 | Koppelman et al. | 106/486 |
| 4,888,315 | 12/1989 | Bowman et al. | 106/486 |
| 5,143,599 | 9/1992 | Derdall et al. | 106/486 |

*Primary Examiner*—M. L. Bell
*Assistant Examiner*—Michael Marcheschi
*Attorney, Agent, or Firm*—Klauber & Jackson

[57] ABSTRACT

A method which enables economical and highly effective preparation of refined kaolin clay products having preselected particle size distributions and brightnesses, by means of separate, efficient and economical processing of at least two crude components. A fine particle size kaolin crude having a PSD such that at least 85% by weight of the particles are of less than 2 micrometers ESD is wet beneficiated to provide a first product component having a PSD of at least 95% by weight less than 2 micrometers and a brightness of at least 89 on the G.E. scale. This wet beneficiation is conducted without use of a froth flotation step. A coarse particle size kaolin crude having a PSD such that less than 85% by weight of particles are of less than 2 micrometers ESD, is separately wet beneficiated to produce a second product component having a PSD of no more than 85% by weight less than 2 micrometers and a brightness of at least 89 on the G.E. scale. This last wet beneficiation is, however, conducted with use of a conventional froth flotation step. The first and second product components are then blended in proportions to produce the desired refined kaolin clay product having a preselected PSD and brightness. The first and second components can also be used as is.

9 Claims, 1 Drawing Sheet

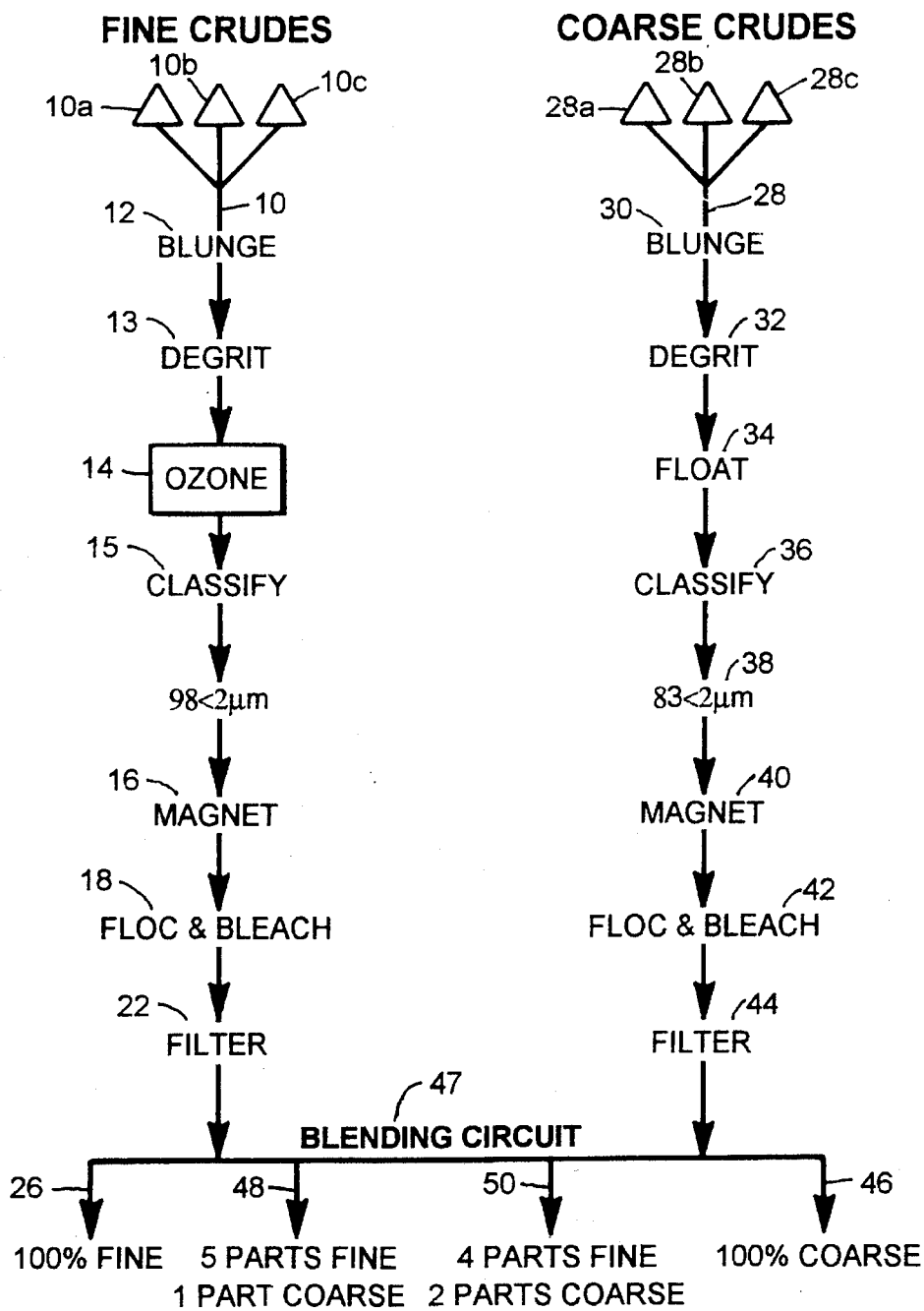

METHOD FOR PREPARING REFINED KAOLIN IN CLAY PRODUCTS

FIELD OF INVENTION

This invention relates generally to methods for processing of inorganic pigments. More specifically, it relates to a method for preparing a refined kaolin clay product having a desired particle size distribution and brightness specification.

Kaolinite-based pigments are commonly used in paper industries for paper filling and paper coating applications. In general, the objectives of using the pigment are to improve paper qualities such as opacity, brightness, smoothness, printing, porosity, surface coverage, light scatter, and to reduce the cost of paper manufacturing. The refined kaolin pigments which are ultimately incorporated into the paper manufacturing process are derived from kaolin crude deposits which vary considerably with respect to their size distribution characteristics (i.e. the particle size distribution or "PSD") and with respect to the presence of impurities. In general, kaolins from Georgia, which are among the principal kaolins of interest to the present invention, can be characterized as being either coarse clays which are Cretaceous in origin, or fine clays which are Tertiary in origin. The terms "Tertiary" and "Cretaceous" as used in the present specification are further elucidated in the well-known reference Grimm, "Applied Clay Mineralogy", McGraw-Hill Book Company, Inc. (1962). Tertiary kaolins are sometimes referred to as "hard" kaolins. They are generally considered to have been deposited as a sediment during the Tertiary geological period or age. Cretaceous kaolins, on the other hand, are considered as representing sediment deposits formed during the Cretaceous geological period. Reference may be had to the aforementioned Grimm text for further details of these types of kaolins.

In the course of processing crude kaolins into finished products, the crude materials are commonly subjected to a series of steps intended to remove undesired impurities, such as discolorants, so as to ultimately provide a refined product which is susceptible to the particular use for which it is intended. Such beneficiation in some instances can be accomplished by dry processing techniques, as for example by air flotation. More commonly, however, especially where the impurities or contaminants to be removed are in some manner chemically combined or intimately associated with the mineral, wet processes of various types are employed. These include such well-known processes as froth flotation, reductive and oxidative bleaching, and high intensity magnetic separation. This is in addition to wet classification which can also be regarded as a beneficiation step achieving some of the aforementioned objectives. References may be had to U.S. Pat. No. 3,974,067 for further details of flotation procedures. Other aspects of flotation can be found in numerous places in the prior art including in Cundy, U.S. Pat. No. 3,450,257; and in U.S. Pat. Nos. 2,990,958, 3,138,550, and 4,518,491.

One of the purposes of froth flotation is to remove titania (which is commonly associated with or stained with discoloring iron compounds), and accordingly other techniques can be utilized in place of or to supplement flotation, including by passing the slurry in relatively dilute form and while the clay is dispersed (typically at about 30% solids) through a high intensity magnetic field, e.g. via a magnetic separator of the type disclosed in Marston, U.S. Pat. No. 3,627,678. Such device comprises a canister packed with stainless steel wool at which enveloping magnetics are capable of producing a high intensity field of 12 kilogauss or higher. Froth flotation may also be combined with magnetic separation to achieve synergistic effects. See for example U.S. Pat. No. 3,974,067 to Allen J. Nott. A further commonly used method for improving the brightness and whiteness of kaolin clays involves chemical bleaching. One of the principal sources of discolorant contaminants in the crude clay takes the form of insoluble oxides of iron. Thus a common bleaching technique for removing the said contaminates involves forming the clay into an aqueous slurry, acidifying the slurry to a pH of the order of 3.0 to 4.0 and adding a slurry soluble salt of hydrosulfurous acid. The general objection of this operation is to provide the $S_2O_4^=$ ion which acts as a reductive bleaching agent. Such ion functions to reduce the ferric compounds present in the slurry to ferrous form, the latter being readily soluble and therefore removable by subsequent washing, dewatering and filtering operations.

Because the needs of the paper manufacturer vary considerably depending upon the specific application of the refined kaolin pigment, kaolin manufacturers traditionally produce a variety of refined kaolin products. These finished products are commonly specified in terms of several parameters which the manufacturer considers to be significant. In the instance of so-called "hydrous" kaolins, by which is meant a kaolin which has not been subjected to temperatures above about 450° C., which temperatures serve to impair the basic crystal structure of kaolin, the most important parameters of interest are the particle size distribution or PSD, and the pigment brightness. Procedures for measuring brightness as set forth in this application, and as is generally recognized in the industry are in accord with TAPPI procedure T646os-75. The figures yielded by this procedure are on the so-called G.E. scale.

Heretofore it has been common practice in the kaolin industry where it is desired to yield a refined product having desired brightness and PSD characteristics to start with a crude or blend of crudes which are considered to be well adapted to production of the end product. For example, if the final refined product is one which is desired to have a relatively fine PSD, then the feed crude subjected to what is typically wet processing is one that itself has a relatively high percentage of fines, or two or more crudes are blended for the same purpose. The processing has then been adapted to the crude (or blend of crudes) in order to yield the desired product. This prior art type of processing, however, has failed to take account of an important characteristic of the crudes. Specifically, it has long been appreciated that the coarse Cretaceous clays contain most impurities in the fine fraction of same. Conversely, the fine clays, i.e. those which are Tertiary in origin, contain most of the impurities in the coarse fraction of same. As a result of the distinctions in the inherent characteristics of these two types of crudes, the type of beneficiation to which each is most effectively subjected varies considerably. Specifically, in the instance of crudes containing large quantities of fines such as the aforementioned Tertiary crudes, flotation procedures, while effective, are not economically ideal. The fine fraction contained in the these fine crudes tend to be unduly removed as rejects during flotation so that there are lower recovery rates. More froth is produced, with more fines being lost. In principle, therefore, it would be desirable not to subject these fine crudes to froth flotation processing, but rather to beneficiate them solely by techniques appropriate to them.

SUMMARY OF INVENTION

Now in accordance with the present invention, a method has been discovered which enables economical and highly effective preparation of refined kaolin clay products having preselected particle size distributions and brightnesses, by means of separate, efficient and economical processing of at least two crude components. According to the method of the invention, a fine particle size kaolin crude having a PSD such that at least 85% by weight of the particles are of less than 2 micrometers ESD is wet beneficiated to provide a first product component having a PSD of at least 95% by weight less than 2 micrometers and a brightness of at least 89 on the G.E. scale. This wet beneficiation is conducted without use of a froth flotation step. A coarse particle size kaolin crude characterized as having a PSD such that less than 85% by weight of particles are of less than 2 micrometers ESD, is separately wet beneficiated to produce a second product component having a PSD of no more than 85% by weight less than 2 micrometers and a brightness of at least 89 on the G.E. scale. This last wet beneficiation is, however, conducted with use of a conventional froth flotation step. The first and second product components are then blended in proportions to produce the desired refined kaolin clay product having a preselected PSD and brightness. The resulting product can typically have a PSD in the range of 83 to 98% by weight of the particles less than 2 micrometers ESD, and a brightness in the range of 89 to 91.

BRIEF DESCRIPTION OF DRAWINGS

In the drawing appended hereto:

The FIGURE is a schematic flow diagram illustrating the processing of a fine and a coarse kaolin crude, and the manner in which the resulting refined products may then be blended to produce a variety of desired products.

DESCRIPTION OF PREFERRED EMBODIMENT

The manner in which the invention may be effectively practiced is illustrated in the FIGURE, in which a fine Tertiary crude and a coarse Cretaceous crude are separately beneficiated to yield a variety of finished kaolin products. The fine crude 10 typically comprises a gray hard kaolin of Tertiary origin, which may have a particle size distribution such that 85 to 90% by weight of the particles have a ESD (equivalent spherical diameter) of less than 2 microns. Crude 10 can itself comprise a blend of two or more starting crudes 10a, 10b, 10c etc. The said crude 10 is subjected to a relatively conventional processing sequence. Specifically, it is first blunged with water at 12 together with a suitable dispersing agent such as a polyacrylate, to form a slurry of about 40 to 60% solids. This slurry is degritted at 13 to remove +325 mesh material and the slurry at a solids content of about 30% is subjected to ozonation at 14 in a conventional ozonizing unit. The slurry may then be classified at 15 to approximately 98% below 2 micrometers and 82 to 90% less than 0.5 micrometers. At about 40% solids the said slurry is then passed through a high intensity magnetic separator at 16, which may be of the type alluded to in Marston U.S. Pat. No. 3,627,678 previously referred to. The resulting purified slurry from the magnet is then flocculated and bleached at 18 with hydrosulfite ion, and filtered at 22 on a rotary vacuum filter. The resulting material at 26 is now at about 90 to 91 brightness and has a PSD such that 98% are less than 2 micrometers. This material per se may be regarded as a first refined kaolin pigment product, which is particularly suitable for high quality coating of certain types of papers.

Turning to the second processing line, a coarse crude 28 (which can be a mixture of two or more starting crudes 28a, 28b, 28c etc.) having a PSD of less than 85% and preferably 60 to 75% by weight of the particles being less than 2 micrometers, is subjected to blunging 30 and degritting 32 as aforementioned, but in this instance the resulting slurry is subjected to flotation 34, which may be carried out by procedures of the type set forth in the prior art patents cited. Because the material subjected to flotation is to begin with a coarse crude, the recovery is very high, i.e. removal of the contaminants is highly effective, without, however, suffering loss of valuable useful fractions as would occur were the fine crudes also present in the flotation circuit. The underflow from flotation is subjected to classification 36 and a fraction 38 recovered having approximately 83% by weight of the particles less than 2 micrometers. This fraction 38 is diluted to 30% solids and passed through a high intensity magnetic separation step at 40, as aforementioned in the fine crude circuit. The resulting material is again flocced and bleached at 42 and filtered at 44. The material is then repulped and redispersed at about 60% solids. The resulting brightness in this material 46 is then approximately 89 to 90 on the G.E. scale. The PSD is again characterized as 83% less than 2 micrometers. This material is regarded as a relatively coarse final product. The resulting material 46 is per se considered a coating material for use in paper applications.

The two resulting products 26 and 46 may, however, now be blended in a blending circuit 47 to produce two further products 48 and 50 which have characteristics making them suitable for specific applications. Product 48, by way of example, consists of five parts of product 26 and one part of product 46. It has a PSD of 95% by weight less than 2 micrometers. This product has a G.E. brightness of about 90 and is considered to be a highly useful glossing pigment. Second, a product 50 is shown, which consists of four parts of the fine product 26 and two parts of the coarse product 46. The particle size distribution in product 50 is 91% by weight less than 2 micrometers, and it has a brightness of 89 to 90. This product is considered to be a useful coating pigment for paper applications. It will be similarly apparent that a variety of further products having preselected PSD's and brightnesses may be readily produced from other blend ratios of products 26 and 46.

The overall advantages yielded by the invention are such as to markedly improve economics, quality, flexibility and control in the course of kaolin pigment production. By processing the fine and coarse crude fractions separately, advantage may be taken of the economics and technology which are most applicable to each of these fractions, and the best and most appropriate technology utilized for each such fraction.

While the present invention has been particularly set forth in terms of specific embodiments thereof, it will be understood in view of the instant disclosure, that numerous variations upon the invention are now enabled to those skilled in the art, which variations yet reside within the scope of the present teaching. Accordingly, the invention is to be broadly construed, and limited only by the scope and spirit of the claims now appended hereto.

What is claimed is:

1. A method for preparing a refined kaolin clay product having a PSD in the range of 83% to 98% less than 2 micrometers, and a G.E. brightness in the range of 89 to 91, by separate, efficient and economical processing of at least two crude components; said method comprising:

(a) wet beneficiating a fine particle size kaolin crude having a PSD such that at least 85% by weight of the particles are of less than 2 micrometers ESD, to provide a first product component having a PSD of at least 95% by weight less than 2 micrometers, and a brightness of at least 89 on the G.E. scale: said wet beneficiation being conducted without use of a froth flotation step;

(b) separately wet beneficiating a coarse particle size kaolin crude having a PSD such that no more than 85% by weight of the particles are of less than 2 micrometers ESD, to produce a second product component having a PSD such that less than 85% by weight of the particles are of less than 2 micrometers ESD and a brightness of at least 89 on the G.E. scale; said wet beneficiation being conducted with use of a froth flotation step; and (c) blending said first and second product components in proportions to produce said refined kaolin clay product.

2. A method in accordance with claim 1, in which said fine kaolin crude is of Tertiary origin, and said coarse kaolin crude is of Cretaceous origin.

3. A method in accordance with claim 2, wherein said fine kaolin crude is a gray hard kaolin.

4. A method in accordance with claim 2, wherein said wet beneficiating of said fine crude includes subjecting said crude to high intensity magnetic separation.

5. A method in accordance with claim 2, wherein said wet beneficiating of said fine crude includes subjecting said crude to ozone.

6. A method in accordance with claim 1, wherein the wet beneficiating of said fine particle size kaolin crude includes subjecting said crude to ozone and to high intensity magnetic separation; and the wet beneficiating of said coarse particle size kaolin crude includes a step of high intensity magnetic separation.

7. A method in accordance with claim 1, wherein said first and second product components are blended to produce at least two of said refined kaolin clay products.

8. A method for preparing at least fine and coarse refined kaolin clay products and at least one product blended from said fine and coarse products which has a PSD in the range of 83% to 98% less than 2 micrometers, and a G.E. brightness in the range of 89 to 91, by separate, efficient and economical processing of at least two crude components; said method comprising:

(a) wet beneficiating a fine particle size kaolin crude having a PSD such that at least 85% by weight of the particles are of less than 2 micrometers ESD, to provide a first product component having a PSD of at least 95% by weight less than 2 micrometers, and a brightness of at least 89 on the G.E. scale; said wet beneficiation being conducted without use of a froth flotation step;

(b) separately wet beneficiating a coarse particle size kaolin crude having a PSD such that no more than 85% by weight of the particles are of less than 2 micrometers ESD, to produce a second product component having a PSD such that less than 85% by weight of the particles are of less than 2 micrometers ESD and a brightness of at least 89 on the G.E. scale; said wet beneficiation being conducted with use of a froth flotation step; and (c) utilizing said first and second product components as said fine and coarse refined kaolin clay products, and blending said first and second product components in proportions to produce said refined kaolin clay product.

9. A method in accordance with claim 8, in which said fine kaolin crude is of Tertiary origin, and said coarse kaolin crude is of Cretaceous origin.

* * * * *